United States Patent Office 3,548,666
Patented Dec. 22, 1970

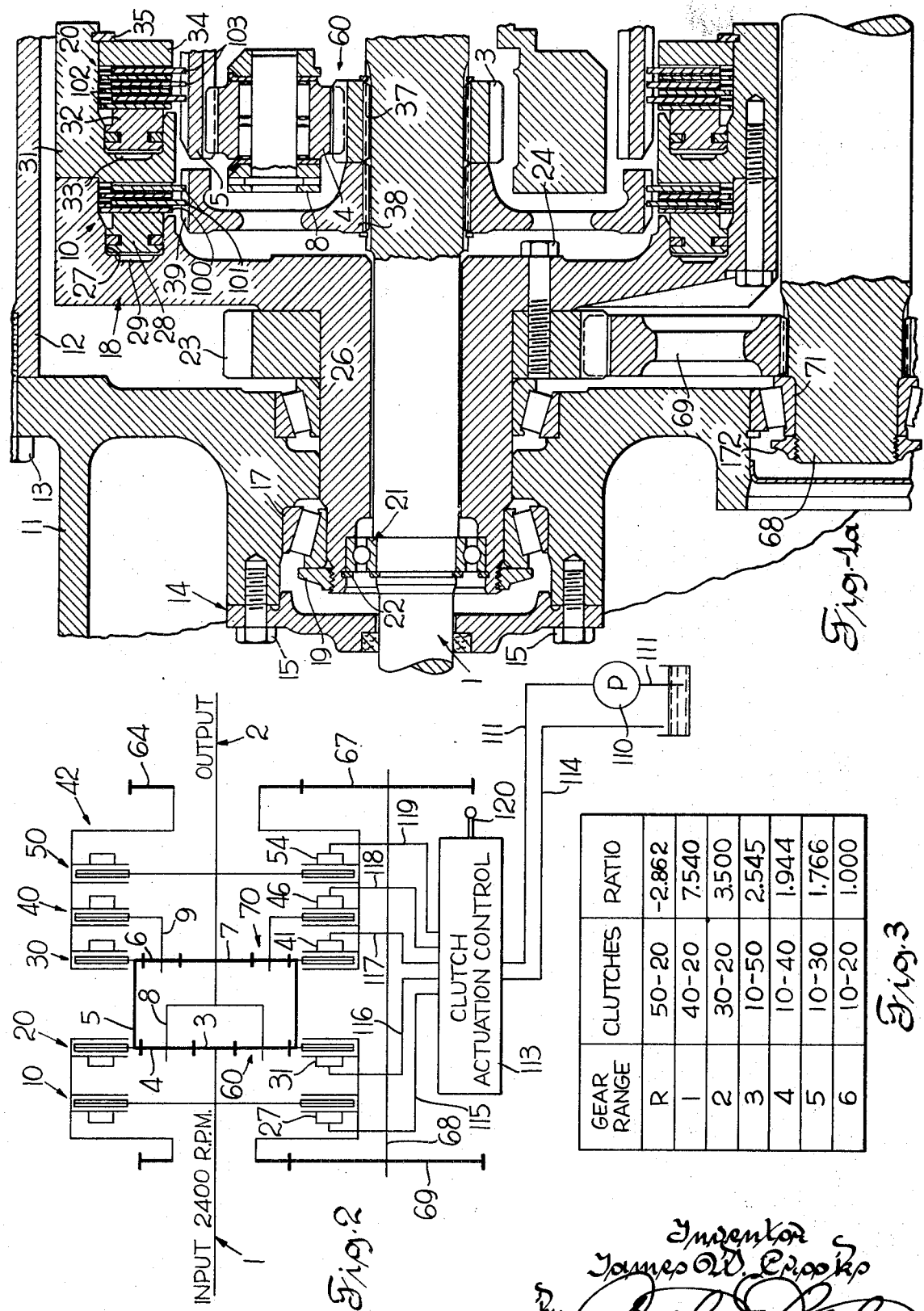

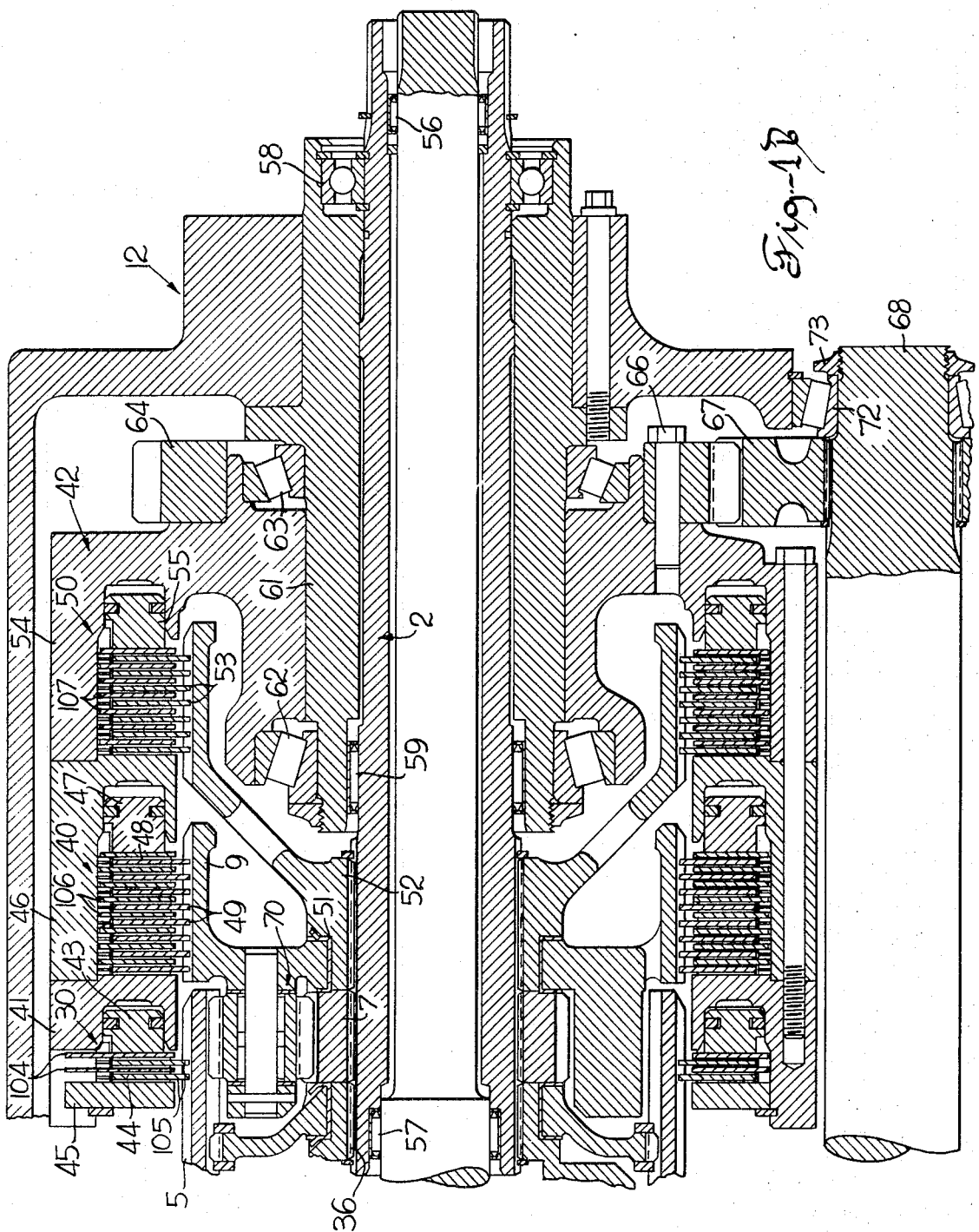

3,548,666
MULTIPLE SPEED TRANSMISSION
James W. Crooks, Whitefish Bay, Wis., assignor to Allis-Chalmers Manufacturing Company, Milwaukee, Wis.
Filed June 23, 1969, Ser. No. 835,469
Int. Cl. B60k 17/28; F16h 37/06
U.S. Cl. 74—15.63
10 Claims

ABSTRACT OF THE DISCLOSURE

A planetary type power shift transmission having countershaft gearing and means to provide forward and reverse shifting of the transmission through selective engagement of a plurality of hydraulically actuated clutches on clutch housing controlling power transmission through concentrically located planetary gearsets.

This invention relates to a vehicle transmission and more particularly to a planetary type transmission having countershaft gearing connected between concentric rotating clutch housings carrying clutches for selectively providing alternate power paths through planetary gearsets of the transmission.

The conventional power shift transmissions should provide a plurality of speeds forward and a reverse speed. It is advantageous to provide simplicity of operation with a minimum number of clutches and transition shifts for shifting from one speed range to another. The transmission should use a minimum number of gears with an arrangement to provide greatest efficiency of power transmission.

This invention provides a plurality of forward speeds, and a reverse speed in a power shift transmission having a total of five hydraulic actuators for operating clutches in the transmission. The transmission comprises two planetary gearsets having common ring gears. The input shaft is connected to the sun gear of the first planetary gearset while the output shaft is connected to the sun gear of the second planetary gearset and the planetary carrier of the first planetary gearset. Countershaft gearing is connected between gears on clutch housings. The housings also carry clutches for selectively engaging elements on the planetary gearsets. The clutches provide a plurality of power paths through the transmission which selectively provide gear ratios over a wide range of speeds.

It is an object of this invention to provide a planetary transmission having countershaft gearing with hydraulically actuated clutches to provide selective power paths through the transmission.

It is another object of this invention to provide a power shift transmission having two planetary gearsets and countershaft gearing to selectively engage clutches on clutch housings rotating concentrically with the planetary gearsets. The transmission is operated by selective engagement of the clutches.

It is a further object of this invention to provide a power shift transmission haivng two planetary gearsets having a common ring gear and clutch housings operating concentrically about a common axis. A countershaft gearset is connected to gears carried on the clutch housing to provide selective power paths thorugh the first planetary gearset, the second planetary gearset, or the countershaft gearset in response to selective actuation of the plurality of clutches located on said clutch housings.

It is a further object of this invention to provide a power shift transmission having an input shaft extending concentrically through a first planetary gearset and a second planetary gearset to provide power takeoff on the output end of the transmission. The transmission further provides countershaft gearing operating to provide direct drive or counterdrive through the planetary gearsets or the countershaft gearset to selectively operate the transmission.

The objetcs of this invention are accomplished by use of the transmission having a first planetary gearset having a sungear connected to the input shaft. A second planetary gearset rotating upon a common axial center is connected to the output shaft and the output shaft is connected to the planetary carrier of the first planetary gearset. An input clutch housing rotates about a common center with the first planetary gearset and an output clutch housing rotates about a common center with the second planetary gearset. The clutch housings each carry a gear which engages a gear on a countershaft positioned on an axis parallel with the axis of the planetary gearsets. The input clutch housing has means for connecting a clutch to the sun gear, or the ring gear of the first planetary gearset. The clutches on the input clutch housing provide direct rotation or counterrotation of the input clutch housing relative to the sun gear and the input shaft. The output clutch housing rotating upon a common axial center with the output shaft is provided with three clutches each having a friction member. The friction member of the first clutch is connected to the ring gear of the second planetary gearset while the friction member of the second clutch is connected to the planetary carrier, and the friction member of the third clutch is connected to the sun gear to provide plural power paths from the second planetary gearset. The countershaft connected to gears on the clutch housings provides counterrotation of the housings to thereby provide a single or plural power paths through the transmission which produce positive and/or negative torque output at selective gear ratios.

The preferred embodiments of this invention are illustrated in the attached drawings.

FIG. 1a illustrates the input side of the transmission.
FIG. 1b illustrates the output side of the transmission.
FIG. 2 is a schematic illustration of the transmission.
FIG. 3 is a table illustrating the gear range when the clutches indicated are actuated and the gear ratio for the transmission illustrated on FIG. 1a and 1b as well as FIG. 2.

Referring to the drawings, the housing 11 is fastened to the transmission case 12 by means of a pluarlity of bolts 13.

The housing 11 also supports the end plate 14 which is fastened by a plurality of bolts 15. The end plate 14 embraces the seal assembly 16.

The housing 11 also embraces bearing assembly 17 carrying the input housing 18 and held by a retainer 19. The input clutch housing 18 also encircles the bearing assembly 21 and which is retained in the clutch housing by the snap ring 22.

The input clutch housing 18 carries a drive gear 23 which is fastened by a plurality of bolts 24 which engages the bearing assembly 26 in housing 11.

The input clutch housing 18 defines the hydraulic cylinder 27 which receives the annular piston 28 which define the pressurizing chamber 29. The hydraulic cylinder 31 is integral with the clutch housing 18 and receives a piston 32 which defines a pressurizing chamber 33. The piston 28 compresses the disc stack of clutch 10 against the backside of the cylinder 31. The disc stack includes disc 100 carried on cylinder 27 and disc 101 carried on plate 39. The piston 32 compresses the disc stack in the clutch 20 against the reaction plate 34 which is retained in the cylinder 31 by the snap ring 35. The disc stack of clutch 20 includes discs 102 carried on cylinder 31 and discs 103 carried on ring gear 5.

The input drive shaft 1 supplies the torque to the first planetary gearset 60 which drives the sun gear 3. The sun gear 3 is connected to planetary gears 4 which in turn mesh with the ring gear 5. The planetary carrier 8 extends toward the second planetary gearset where it is connected to the output quill shaft 2 and is connected by means of mating spline connections 36. The sun gear 3 is connected by a spline connection 37 to the input shaft 1. The annular plate 38 is spline connected to the input shaft 1 on its internal periphery and has a spline 39 for receiving friction elements of the clutch 10. The torque from the input shaft is transmitted through the clutch hub 39 to the clutch 10 on the input clutch housing 18, or through the planetary gearset to the ring gear 5 which in turn carries a friction member of the clutch 20 supported on the input clutch housing 18.

The ring gear 5 is a common ring gear for both the first planetary gearset 60 and the second planetary gearset 70. The ring gear is splined on its external periphery to carry a clutch disc in the clutch 30 which is mounted in the cylinder 41 carried on the output clutch housing 42. The cylinder 41 receives the piston 43 which compresses the disc stack 44 against the reaction plate 45 fastened to the cylinder 41. The disc stack 44 includes discs 104 carried on cylinder 41 and discs 105 carried on ring gear 5. The clutch 40 includes a cylinder 46 receiving a piston 47 compressing a disc stack 48 against the backside of cylinder 41. A plurality of friction elements 49 are received on the splined external periphery of the planetary carrier 9 of the second planetary gearset 70. The discs 106 are carried on the cylinder 46. The carrier 9 is rotatably mounted on the bushing 51 seated on external periphery of the sleeve 52 which is splined on its internal periphery to receive a mating spline on the output quill shaft 2. The sleeve 52 is splined on its external periphery and receives a plurality of friction elements 53. The friction elements 107 are carried on the cylinder 54 of the clutch 50. The clutch cylinder 54 receives the piston 55 for compressing the disc stack against the backside of the cylinder 46. The clutch 50 engages disc 53 for transmitting power through the sleeve 52 to the output clutch housing 42. Accordingly, the clutch 30 controls transmission of the torque to the output clutch housing 42 from the ring gear 5. The clutch 40 transmits torque to the output clutch housing 42 from the carrier 9 on the second planetary gearset 70. The sleeve 52 accordingly transmits torque from the output quill shaft 2 which is also connected to the sun gear 7 of the second planetary gearset to the output clutch housing 42.

Referring to FIG. 1b, the output quill shaft 2 is rotatably mounted on needle bearing assembly 56 as well as the needle bearing assembly 57. The output quill shaft 2 is embraced by the ball bearing assembly 58 as well as the needle bearing assembly 59 received within the support sleeve 61 and casing 12.

The bearing assemblies 58 and 59 are received within the support sleeve 61 and the support sleeve 61 is mounted within the transmission case 12. The support sleeve 61 is encircled by the roller bearing assembly 62 and 63 which in turn rotatably support the output clutch housing 42. The output clutch housing 42 carries the driven gear 64 which is fastened by a plurality of bolts 66. The driven gear 64 is driven by the pinion gear 67 mounted on the end of the countershaft 68. The opposite end of the countershaft 68 carries the spur gear 69 which is driven by the drive gear 23. The countershaft 68 is rotatably mounted in the bearing assembly 71 and 72 which are mounted in the housing 11 and case 12. The bearing retainer 172 and 73 on the ends of the countershaft 68 abut the bearings 71 and 72, respectively.

FIG. 2 illustrates schematically the transmission shown in FIG. 1a and 1b. The input shaft 1 is connected to the sun gear of the first planetary gearset 60 which is coaxially mounted with the second planetary gearset 70. The output quill shaft 2 is connected to the sun gear at the second planetary gearset and the planetary carrier of the first planetary gearset 60. The countershaft gearing includes the drive gear 23 and the spur gear 69. The spur gear 69 is carried on the countershaft 68 as well as the pinion gear 67. The pinion gear 67 drives the driven gear 64 which is carried on the output clutch housing 42. FIG. 3 shows a table which illustrates the operation of the transmission and the speed ratios used in the transmission with the clutches actuated as indicated to operate the gear range as shown.

The transmission provides a reverse gear and five speeds forward through selective operation of the clutches. The reverse range of the transmission is operated by actuating the clutch 20 engaging the ring gear of the first planetary gearset with the input clutch housing while also engaging the sun gear of the second planetary gearset through clutch 50 to the output clutch housing 42. This will provide input torque from the sun gear 3 through the carrier 8 to the ring gear 5. The ring gear torque is then in a negative direction and is connected to the countershaft gear train by the clutch 20. The negative torque is multiplied by the countershaft gears and transferred to the carrier output by means of the clutch 50. The difference between the positive torque transmitted to the carrier by the sun gear and the negative torque transmitted to the carrier by the ring gear multipled by the countershaft gears produces a net resultant negative torque to the output shaft 2 in a reverse gear range.

In the first gear range the clutches 20 and 40 are actuated. The clutch 20 engages the ring gear 5 with the input clutch housing 18 while the clutch 40 engages the planetary carrier 9 of the second planetary gearset 70 with the output clutch housing 42. This provides an input torque which passes through the input shaft 1 to the sun gear 3. Positive torque is transferred to the carrier 8 and negative reaction torque is transferred to the portion of the ring gear 5 meshing with the front planetary gears 4. The negative torque passes to the portion of the ring gear 5 meshing with the second planetary gears 6 of the second planetary gearset 70 and contributes negative torque to the carrier 9. The torque on the carrier 9 is regenerated through the clutch 40 and the countershaft gearset and clutch 20 back to the ring gear 5. This results in a much higher negative torque on the portion of the ring gear meshing with the planetary gears 6 of the second planetary gearset than from the first reaction of the front planetary gearset. The reaction to the total negative torque on the portion of the ring gear meshing with the rear planetary gears 6 is positive on the sun gear 7 and positive reaction is additive to the torque on the carrier 8 resulting in a high numerical torque ratio multiplication at the output quill shaft 2.

In the second gear range the clutches 20 and 30 are actuated. The clutch 20 engages the ring gear 5 of the first planetary gearset 60 for clutching the ring gear to the input housing 18. The clutch 30 is engaged for clutching the ring gear 5 on the second planetary gearset 70 to the output clutch housing 42. Input torque is applied to the sun gear 3 of the first planetary gearset but as long as different ratios exist between each pair of countershaft gears, the countershaft gearset cannot rotate when the housings are connected together by means of the clutches 20 and 30 and the ring gear 5. With the ring gear stopped, a single planetary reduction to the output shaft results.

In the third gear range indicated in the table of FIG. 3, the clutch 10 on the first planetary gearset connects the sun gear to the inupt clutch housing 18 while the clutch 50 engages the sun gear of the second planetary gearset 7 to the output clutch housing 42. The input torque passes through the countershaft gearing by the clutch 10. The input torque is multiplied by the countershaft gears and transferred to the output shaft by the clutch 50. The planetary gears have no function for this particular gear range.

When the transmission is in the fourth gear range as indicated in the table of FIG. 3, clutch 10 connects the sun gear 3 of the first planetary gearset 60 to the input clutch housing 18. The clutch 40 connects the planetary carrier 9 to the output clutch housing 42. The input torque passes through the sun gear 3 to the input clutch housing 18. The portion of the torque transmitted through the clutch 10 to the clutch housing 18 is multiplied by the countershaft gears and transferred to the planetary carrier 9 of the second planetary gearset 70 by the clutch 40. A portion of the resultant torque on the carrier 9 becomes reaction for the torque on the carrier 8 and the other portion of the torque on the carrier 9 is added to the output shaft through the sun gear 7. The output torque is the sum of the resultant torque on the sun gear 7 and the resultant torque on the carrier 8.

With the transmission in the fifth gear range as indicated on table in FIG. 3, the clutch 10 engages the sun gear 3 on the first planetary gearset 60 with the input clutch housing 18. The clutch 30 engages the ring gear 5 of the second planetary gearset to the output clutch housing 42. The input torque passes to the sun gear 3 and the clutch 10 to the input clutch housing 18. The portion of the torque transmitted through the clutch 10 is multiplied by the countershaft gearings and transferred to the ring gear 5 by the clutch 30. The output torque is the sum of the resultant ring gear torque and the portion of the input torque going to the sun gear 3.

When the transmission is in the sixth gear range as indicated on the table in FIG. 2, the clutch 10 engages the sun gear 3 of the first planetary gearset 60 with the input clutch housing 18. The clutch 20 engages the ring gear 5 of the first planetary gearset 60 with the input clutch housing 18. The second planetary gearset 70 is free to rotate. The input torque passes through the sun gear and the clutch 10. The clutch 10 drives the clutch 20 which is connected to the ring gear 5 of the first planetary gearset 60. The planetary carrier 8 is thereby locked together by the clutches 10 and 20 causing a direct drive to the output quill shaft 2.

The preferred embodiments of this invention have been illustrated and described. The transmission is a power shift transmission having five clutches and no brake. The transmission, however, will provide a reverse gear range as well as five speeds forward. The transmission is simplified in the use of five clutches which selectively can be operated to provide these functions. The hydraulic system includes the pump 110 receiving hydraulic fluid through conduit 111 on the reservoir 112. The pump 110 supplies pressurized fluid to the clutch actuation control 113. Fluid is returned from the clutch actuation control 113 to the reservoir 112 by means of conduit 114. A plurality of conduits 115, 116, 117, 118 and 119 supplies pressurized fluid to the cylinders 27, 31, 41, 46 and 54, respectively. The control lever 120 operates the clutch actuation control 113 to selectively operate one or more of the hydraulic cylinders operating the clutches 10, 20, 30, 40 and 50. The actuation to provide a reverse and five forward speed ranges is accomplished by actuating the clutches as indicated in the table shown in FIG. 3.

The embodiments of the invention in which an exclusive property or privilege is claimed are defined as follows:

1. A transmission including an input and output shaft rotatably mounted in a transmission case, a first planetary gearset having a sun gear connected to the input shaft, a second planetary gearset having a sun gear connected to the output shaft and the planetary carrier of the first planetary gearset, a common ring gear for said first and second planetary gearsets, an input clutch housing connected to a drive gear rotatably mounted concentrically with said input shaft, an output clutch housing connected to a driven gear rotatably mounted concentrically with said output shaft, a countershaft gearset having a gear connected to said drive gear and a gear connected to said driven gear, two clutches mounted on said input clutch housing, one friction member included in each clutch on said input clutch housing connected to an element including the sun gear and the ring gear of said first planetary gearset for selectively clutching said element of said first planetary gearset to the input clutch housing, a plurality of clutches mounted on said output clutch housing, one friction member included in each clutch on said output clutch housing connected to an element including the sun gear, ring gear and planetary carrier of said second planetary gearset for selectively clutching said element of said second planetary gear set to the output clutch housing, control means for selectively actuating said clutches for transmitting power through selective gear ratios of said transmission.

2. A transmission as set forth in claim 1 wherein said friction member is connected to the ring gear of said first planetary gearset and is included on one of said clutches on said input clutch housing, another said friction member is connected to said sun gear of said second planetary gearset and included in one of said clutches on said output clutch housing to provide input torque passing through the first planetary gearset and applied as a negative torque on the output shaft and a torque through the countershaft gearset is transferred to the sun gear of said second planetary gearset as a positive torque producing a net resultant negative torque on the output shaft and reverse rotation of the output shaft of said transmission.

3. A transmission as set forth in claim 1 wherein said friction member in a clutch on said input clutch housing is connected to the ring gear of said first planetary gearset, another said friction member on one of said clutches of said output clutch housing is connected to the planetary carrier of said second planetary gearset to thereby provide a positive torque on the carrier at the first planetary gearset and with a positive torque on the sun gear of the second planetary gearset resulting in a high torque ratio on the output shaft.

4. A transmission as set forth in claim 1 wherein said friction member of said first planetary gearset is connected to the sun gear and is included in a clutch on said input clutch housing, another said friction member of said second planetary gearset is connected to the sun gear and included in a clutch on said output housing for transferring torque through the countershaft gearset to the output shaft to provide a forward speed gear range for said transmission.

5. A transmission as set forth in claim 1 wherein said friction member of said first planetary gearset is connected to the sun gear and included in a clutch on said input clutch housing, a friction member of said second planetary gearset is connected to the planetary carrier and included in a clutch on said output clutch housing to provide torque through the countershaft gearset transferred to the carrier of said second planetary gearset while a portion of the torque from the carrier of the first planetary gearset becomes a reaction torque and the torques become additive producing an output torque which is the sum of the resultant torque on the output shaft.

6. A transmission as set forth in claim 1 wherein said friction member of said first planetary gearset is connected to the sun gear and included in a clutch on said input clutch housing, another said friction member o fsaid second planetary gearset is connected to the ring gear and included in a clutch on the output clutch housing to provide an input torque to the sun gear and the input clutch housing is multiplied by the countershaft gearset and transferred to the ring gear of the second planetary gearset whereby the torque output is the sum of the resultant ring gear torque and a portion of the input torque supplied to the sun gear of the first planetary gearset.

7. A transmission as set forth in claim 1 wherein said friction member of the first planetary gearset is connected to the sun gear and included in a clutch on the input clutch housing, a second friction member of the first planetary gearset is connected to the ring gear and included in a clutch on said input clutch housing to provide input torque to the sun gear and the ring gear of said first planetary gearset and locking the planetary gearset together to provide a direct drive to the output shaft.

8. A transmission as set forth in claim 1 wherein said friction member of the first planetary gearset is connected to the ring gear and included in a clutch on the input clutch housing, another said friction member of the second planetary gearset is connected to the ring gear and included in a clutch on said output clutch housing to provide a locking of the ring gear through the countershaft gearset and thereby provide a simple planetary reduction to the output shaft.

9. A transmission as set forth in claim 1 wherein the input drive shaft extends coaxially through the transmission concentric with an output quill shaft, said input shaft is provided with a power takeoff spline to provide power takeoff from said transmission.

10. A transmission as set forth in claim 1 wherein the sun gear of the first planetary gearset carries a friction member included in a clutch on the input housing, the ring gear of the first planetary gearset carries a friction member included in a clutch on the input clutch housing, said second planetary gearset includes a friction member on each of the elements including the ring gear, planetary carrier and sun gear, each of said clutches on said output clutch housing includes one of said friction member of said second planetary gearset to thereby provide selective clutching between the housings and the planetary gearsets and selectively shift the transmission into reverse gear range, and five forward gear ranges.

References Cited

UNITED STATES PATENTS

| | | | |
|---|---|---|---|
| 2,511,039 | 6/1958 | Black et al. | 74—720 |
| 2,793,533 | 5/1957 | Swenson et al. | 74—15.63 |
| 2,932,202 | 4/1960 | Rinkema | 74—15.63X |
| 3,065,643 | 11/1962 | Mark et al. | 74—15.63 |
| 3,430,518 | 3/1969 | Auriol | 74—705 |
| 3,487,724 | 1/1970 | McIntyre et al. | 74—15.6X |
| 3,487,723 | 1/1970 | Prot | 74—682 |

ARTHUR T. McKEON, Primary Examiner

U.S. Cl. X.R.

74—674, 682, 705